(12) United States Patent
Nakagawa

(10) Patent No.: US 8,760,341 B2
(45) Date of Patent: Jun. 24, 2014

(54) RADAR DEVICE

(75) Inventor: Kado Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 485 days.

(21) Appl. No.: 13/077,384

(22) Filed: Mar. 31, 2011

(65) Prior Publication Data

US 2012/0092209 A1 Apr. 19, 2012

(30) Foreign Application Priority Data

Oct. 13, 2010 (JP) .................................. 2010-230678

(51) Int. Cl.
*G01S 13/42* (2006.01)
*G01S 13/58* (2006.01)

(52) U.S. Cl.
USPC ......................................... 342/109; 342/128

(58) Field of Classification Search
USPC ................................. 342/109, 128
See application file for complete search history.

(56) References Cited

U.S. PATENT DOCUMENTS

| | | | | |
|---|---|---|---|---|
| 5,905,458 A * | 5/1999 | Ashihara | | 342/70 |
| 5,963,162 A * | 10/1999 | Mochizuki et al. | | 342/70 |
| RE37,725 E * | 6/2002 | Yamada | | 342/72 |
| 6,492,938 B1 * | 12/2002 | Alland | | 342/129 |
| 6,606,052 B1 * | 8/2003 | Miyahara | | 342/70 |
| 6,646,589 B2 * | 11/2003 | Natsume | | 342/70 |
| 6,661,370 B2 * | 12/2003 | Kishida et al. | | 342/128 |
| 6,674,393 B2 * | 1/2004 | Kishida | | 342/70 |
| 6,753,805 B2 * | 6/2004 | Nakanishi et al. | | 342/128 |
| 6,778,129 B2 * | 8/2004 | Ishii et al. | | 342/109 |
| 6,856,280 B1 * | 2/2005 | Eder et al. | | 342/147 |
| 6,888,494 B2 * | 5/2005 | Tamatsu et al. | | 342/128 |
| 7,385,550 B2 * | 6/2008 | Winter et al. | | 342/70 |
| 7,466,260 B2 * | 12/2008 | Ishii et al. | | 342/70 |
| 7,508,337 B2 * | 3/2009 | Morinaga et al. | | 342/109 |
| 7,579,981 B2 * | 8/2009 | Kishida | | 342/109 |
| 7,667,637 B2 * | 2/2010 | Pedersen et al. | | 342/107 |

(Continued)

FOREIGN PATENT DOCUMENTS

| | | |
|---|---|---|
| JP | 10-020025 A | 1/1998 |
| JP | 11-038129 A | 2/1999 |
| JP | 2002-236170 A | 8/2002 |
| JP | 2003-167047 A | 6/2003 |

OTHER PUBLICATIONS

Japanese Office Action, Patent Application No. 2010-230678, dated Dec. 14, 2013.

(Continued)

*Primary Examiner* — Matthew M Barker
(74) *Attorney, Agent, or Firm* — Sughrue Mion, PLLC

(57) ABSTRACT

Provided is a radar device capable of preventing mispairing from occurring, and obtaining a distance to a target and a relative velocity to the target even if at least one of the peak frequencies of beat signals cannot be extracted and pairs of the peak frequencies cannot be generated. A target estimation part (20) estimates a distance (RN) to a target (21, 22) and a relative velocity (VN) to the target (21, 22) based on a distance (RO) to the target (21, 22) and a relative velocity (VO) to the target (21, 22), which have been decided by a target decision part (13) in a previous cycle, when at least one of the peak frequencies of the beat signal cannot be extracted and the pair of the peak frequencies cannot be generated.

9 Claims, 9 Drawing Sheets

(56) References Cited

U.S. PATENT DOCUMENTS

| | | | |
|---|---|---|---|
| 8,149,158 B2* | 4/2012 | Samukawa et al. | 342/70 |
| 2001/0015698 A1* | 8/2001 | Tokoro | 342/70 |
| 2010/0033364 A1* | 2/2010 | Kishida et al. | 342/70 |
| 2011/0181456 A1* | 7/2011 | Luebbert et al. | 342/70 |
| 2012/0146835 A1* | 6/2012 | Gross et al. | 342/109 |

OTHER PUBLICATIONS

Japanese Office Action, issued in related Patent Application No. 2010-230678, dated Nov. 26, 2013.

* cited by examiner

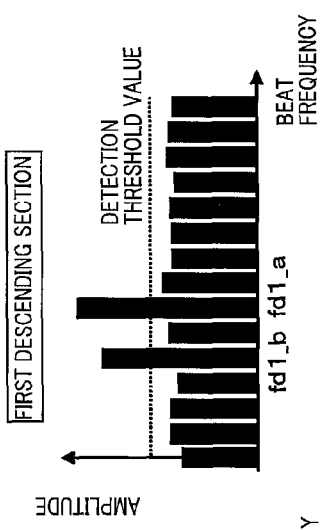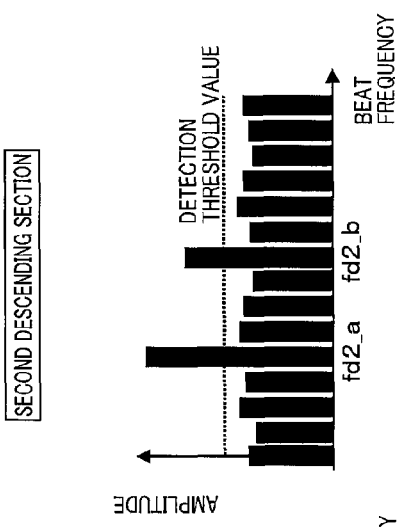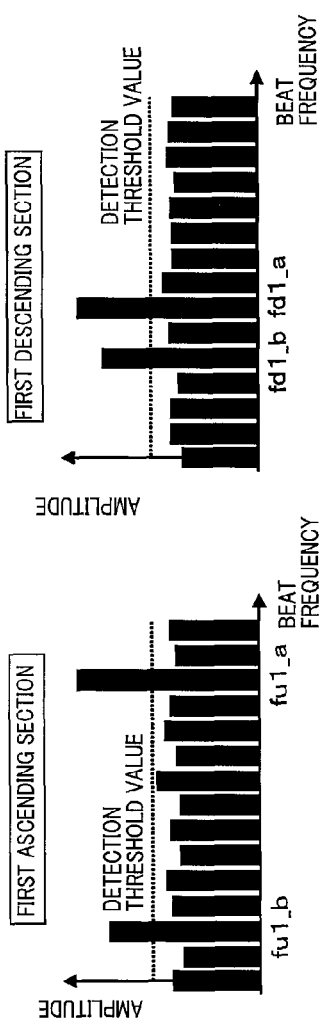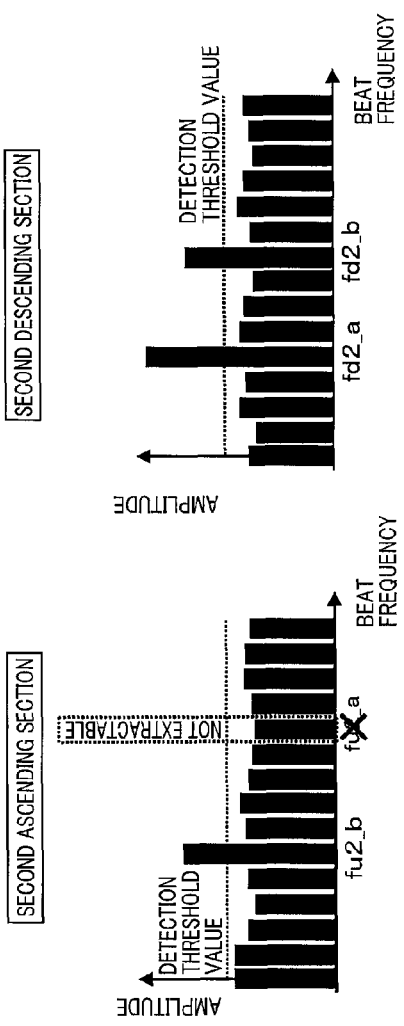

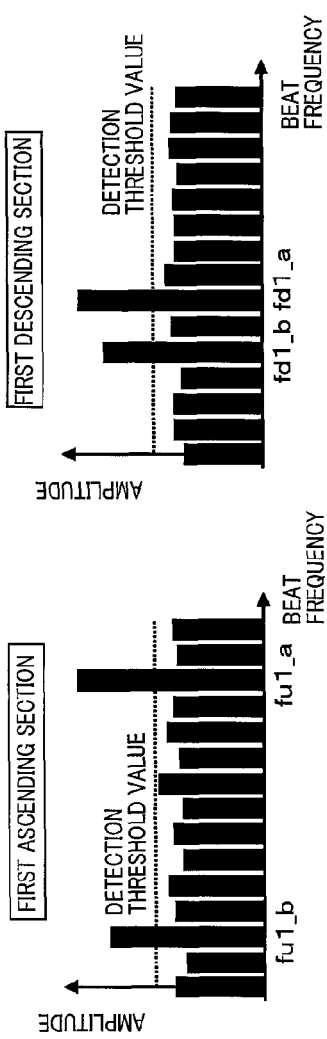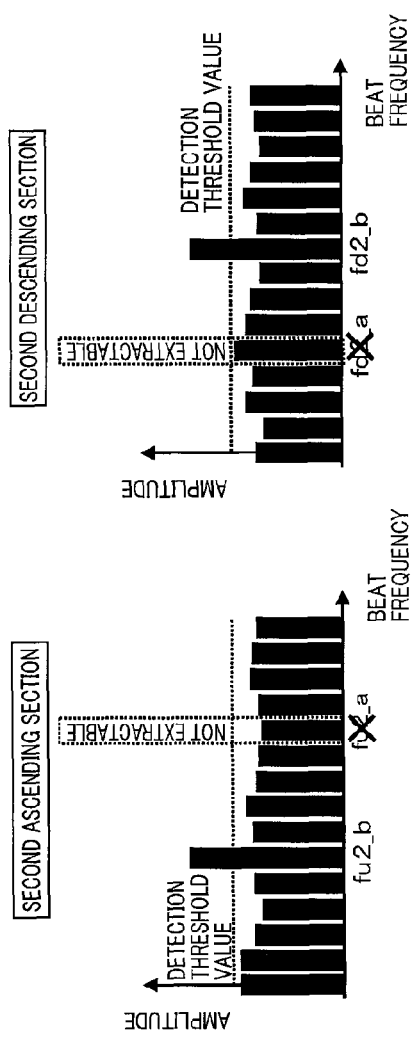

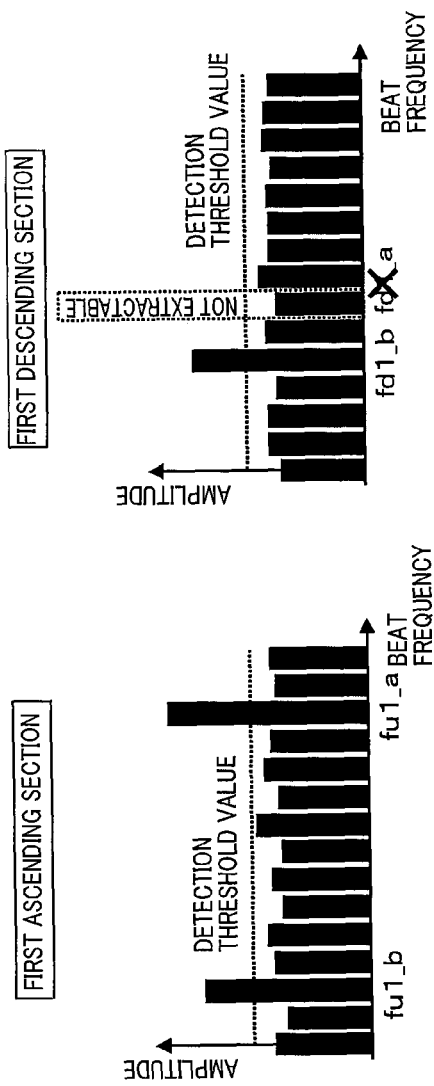
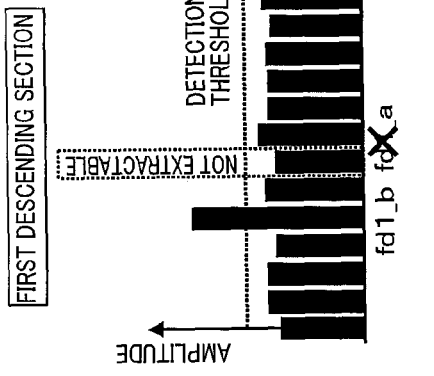
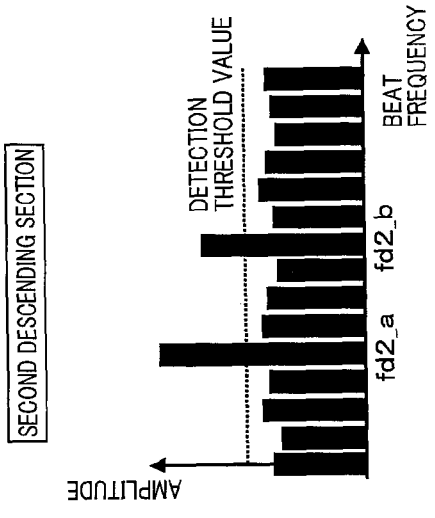
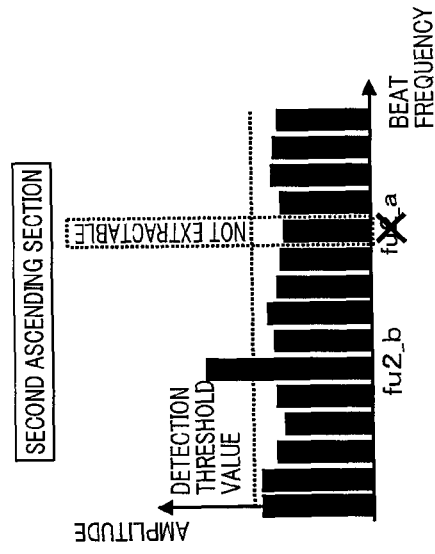

RADAR DEVICE

BACKGROUND OF THE INVENTION

1. Field of the Invention

The present invention relates to a radar device that radiates a transmission signal to a target object (hereinafter, referred to as "target") as an electromagnetic wave, receives a reflected signal resulting from reflecting the transmission signal by the target, and calculates target information based on the reflected signal.

2. Description of the Related Art

Up to now, there has been known a frequency-modulation radar device which calculates a distance to the target and a relative velocity to the target based on peak frequencies of beat signals obtained by transmitting the transmission signals whose frequencies have been continuously modulated to the target, receiving the reflected signals that have been reflected by the target, and mixing the transmission signal and the reflected signal together.

In the radar device of this type, a distance R to the target and a relative velocity V to the target are calculated based on the principle of a general frequency modulation continuous wave (FM-CM) radar as follows.

First, the transmission signal is subjected to the frequency modulation of a triangle wave having a repetition frequency fm and a modulation width $\Delta T$. As a result, the respective frequencies of the transmission signal and the reflected signal are changed with time. It is assumed that a peak frequency of the beat signals in an ascending section where the frequencies of the transmission signal and the reflected signal are linearly increased with time is fu, and a peak frequency of the beat signal in a descending section where the frequencies of the transmission signal and the reflected signal are linearly decreased with time is fd. In this case, those respective peak frequencies are represented by the following Expressions (1) and (2).

$$fu = fr - fp \tag{1}$$

$$fd = fr + fp \tag{2}$$

In Expressions (1) and (2), fr is an amount proportional to the distance R to the target, and fp is an amount proportional to the relative velocity V (an approaching direction is +) to the target, which are represented by the following Expressions (3) and (4), respectively. In the following Expressions (3) and (4), C represents a light speed, and f0 represents a center frequency of the transmission signal.

$$fr = (4 \cdot fm \cdot \Delta F / C) \cdot R \tag{3}$$

$$fp = (2 \cdot f0 / C) \cdot V \tag{4}$$

Hence, the distance R to the target and the relative velocity V to the target are represented by the following Expressions (7) and (8), respectively, by using addition and subtraction of the peak frequencies fu and fd represented by the following Expressions (5) and (6), from Expressions (1) to (4).

$$fu + fd = 2fr \tag{5}$$

$$fu - fd = -2fp \tag{6}$$

$$R = M1 \cdot fr = M1 \cdot (fu + fd) / 2 \tag{7}$$

$$V = M2 \cdot fp = M2 \cdot (-fu + fd) / 2 \tag{8}$$

The following Expressions (9) to (12) are satisfied.

$$M1 = C / (4 \cdot fm \cdot \Delta F) \tag{9}$$

$$M2 = C / (2 \cdot f0) \tag{10}$$

$$fu = R / M1 - V / M2 \tag{11}$$

$$fd = R / M1 + V / M2 \tag{12}$$

When the peak frequency fu of the beat signal in the ascending section and the peak frequency fd of the beat signal in the descending section are found, the distance R to the target and the relative velocity V to the target can be calculated by using Expressions (7) and (8).

In the above-mentioned radar device, when a single target exists, the distance R to the target and the relative velocity V to the target can be precisely calculated. However, when a plurality of targets exist, for example, in a situation of detecting other vehicles on a road, it is difficult to precisely calculate the distances to the respective targets and the relative velocities to the respective targets.

Hereinafter, referring to an example in which two targets a and b exist, processing for calculating the distances to the respective targets and the relative velocities to the respective targets is described. In the description, suffix a is attached to values for the target a, and suffix b is attached to values for the target b.

First, distances Ra and Rb to the targets a and b and relative velocities Va and Vb to the targets a and b are calculated based on peak frequencies fua and fub of the beat signals in the ascending section and peak frequencies fda and fdb of the beat signals in the descending section. To achieve this, there is a need to detect pairs of peak frequencies of the beat signals in the ascending section and the descending section of the respective targets a and b, and substitute the pair into Expressions (7) and (8).

However, when two targets exist, there are two combinations as the pairs of the peak frequencies of the beat signals in the ascending section and the descending section of the targets a and b, that is, a correct combination of a pair {fua, fda} with a pair {fub, fdb} and an incorrect combination of a pair {fua, fdb} with a pair of {fub, fda}.

In this example, when the correct combination of the pair {fua, fda} with the pair {fub, fdb} is selected, the distance Ra to the target a and the relative velocity Va to the target a as well as the distance Rb to the target b and the relative velocity Vb to the target b are precisely calculated.

On the contrary, when the incorrect combination of the pair {fua, fdb} with the pair {fub, fda} is selected, values to be calculated are different from the actual distances Ra and Rb to the targets a and b and the actual relative velocities Va and Vb to the targets a and b. In this way, when there is a plurality of targets, because a plurality of peak frequencies occur, the possibility that the incorrect pair is generated (mispairing occurs) is high.

Under the circumstances, in order to prevent the mispairing from occurring, there has been known a radar device, which utilizes such a property that even when the repetition frequency fm, the modulation width $\Delta F$, or the center frequency f0 of the transmission signal (hereinafter, referred to as "modulated signal") is changed, values of the distance to the target and the relative velocity to the target are not changed as long as the distance and the relative velocity are calculated based on the reflected signal that has been reflected by the same target.

That is, in the radar device, one modulated signal before change in the repetition frequency fm, the modulated width $\Delta F$, or the center frequency f0, and another modulation signal after change, are first transmitted to the same target. Subsequently, the distances to the target and the relative velocities to the target are calculated based on the pair {fu1, fd1} of the peak frequencies of the beat signals in the ascending section and the descending section of the modulated signal before change, and the pair {fu2, fd2} of the peak frequencies of the beat signals in the ascending section and the descending section of the modulated signal after change.

Then, the distance R1 and the relative velocity V1 which are calculated based on the modulated signal before change are compared with the distance R2 and the relative velocity V2 which are calculated based on the modulated signal after change. As a result, when each of the distances and the relative velocities are the same value, it is determined that the correct pairing has been executed, and the calculated distance to the target and the calculated relative velocity to the target are decided (for example, refer to Japanese Patent Application Laid-open No. 2002-236170).

However, the related art suffers from the following problems.

That is, in the radar device disclosed in Japanese Patent Application Laid-open No. 2002-236170, as described above, the distance to the target and the relative velocity to the target are decided based on the pairs {fu1, fd1} and {fu2, fd2} of the peak frequencies of the beat signals in the ascending section and the descending section of the modulated signals before and after changed.

For that reason, when at least one peak frequency cannot be extracted from the peak frequencies of the beat signals, the pair of the peak frequencies cannot be generated. This leads to such a problem that the distances to the target and the relative velocities to the target cannot be obtained.

It is conceivable that at least one peak frequency cannot be extracted in a case where a noise generated in a transceiver or an A/D converter, an offset voltage caused by a device variation or a temperature characteristic, coupling between a transmitter antenna and a receiver antenna, a reflected signal from a point-blank range due to a radome, a reflected signal from another target, a multipath signal, or the like is superimposed on the reflected signal reflected by a desired target, and even if the beat signals obtained from this reception signal are analyzed in frequency, the frequency is reflected to a portion in a given range and cannot be extracted as the peak frequencies.

SUMMARY OF THE INVENTION

The present invention has been made to solve the above-mentioned problems, and therefore an object of the present invention is to provide a radar device capable of preventing mispairing from occurring, and obtaining a distance to a target and a relative velocity to the target even if at least one of the peak frequencies of beat signals cannot be extracted and pairs of the peak frequencies cannot be generated.

A radar device according to the present invention includes: a transmission part that radiates a transmission signal having four modulation sections as a transmission wave; a reception part that receives a reflected wave resulting from reflecting the transmission wave by a target as a reception signal; a mixing part that mixes the transmission signal and the reception signal together to generate a beat signal; and a target detection part that calculates a distance to the target and a relative velocity to the target based on the beat signal, in which the target detection part includes: a peak frequency extraction part that extracts peak frequencies in the respective four modulation sections from the beat signal that has been analyzed in frequency; a first pair distance/relative velocity calculation part that pairs the peak frequencies in two modulation sections of the four modulation sections among the peak frequencies extracted by the peak frequency extraction part to generate a first pair, and calculates the distance and the relative velocity of the first pair; a second pair distance/relative velocity calculation part that pairs the peak frequencies in another two modulation sections different from the two modulation sections among the peak frequencies extracted by the peak frequency extraction part to generate a second pair, and calculates the distance and the relative velocity of the second pair; a target decision part that decides the distance to the target and the relative velocity to the target when the distance and the relative velocity of the first pair are equal to the distance and the relative velocity of the second pair, respectively; and a target estimation part that estimates the distance to the target and the relative velocity to the target based on a distance to the target and a relative velocity to the target, which have been decided by the target decision part in a previous cycle, when at least one of the peak frequencies of the beat signal cannot be extracted and the pair of the peak frequencies cannot be generated.

According to the radar device of the present invention, the target detection part includes: the peak frequency extraction part that extracts the peak frequencies in the respective four modulation sections from the beat signal that has been analyzed in frequency; the first pair distance/relative velocity calculation part that pairs the peak frequencies in two modulation sections of the four modulation sections among the peak frequencies extracted by the peak frequency extraction part to generate a first pair, and calculates the distance and the relative velocity of the first pair; the second pair distance/relative velocity calculation part that pairs the peak frequencies in another two modulation sections different from the two modulation sections among the peak frequencies extracted by the peak frequency extraction part to generate a second pair, and calculates the distance and the relative velocity of the second pair; the target decision part that decides the distance to the target and the relative velocity to the target when the distance and the relative velocity of the first pair are equal to the distance and the relative velocity of the second pair, respectively; and the target estimation part that estimates the distance to the target and the relative velocity to the target based on a distance to the target and a relative velocity to the target, which have been decided by the target decision part in a previous cycle, when at least one of the peak frequencies of the beat signal cannot be extracted and the pair of the peak frequencies cannot be generated.

Therefore, the present invention provides the radar device capable of preventing mispairing from occurring, and obtaining the distance to the target and the relative velocity to the target even if at least one of the peak frequencies of the beat signals cannot be extracted and the pairs of the peak frequencies cannot be generated.

BRIEF DESCRIPTION OF THE DRAWINGS

In the accompanying drawings:

FIGS. 5A to 5D are explanatory diagrams illustrating beat frequency spectrums in the respective modulation sections in the radar device according to the first embodiment of the present invention;

FIGS. 7A to 7D are explanatory diagrams illustrating beat frequency spectrums in the respective modulation sections in the radar device according to the second embodiment of the present invention;

FIGS. 9A to 9D are explanatory diagrams illustrating beat frequency spectrums in the respective modulation sections in the radar device according to the third embodiment of the present invention.

DETAILED DESCRIPTION OF THE PREFERRED EMBODIMENTS

Figure 1:
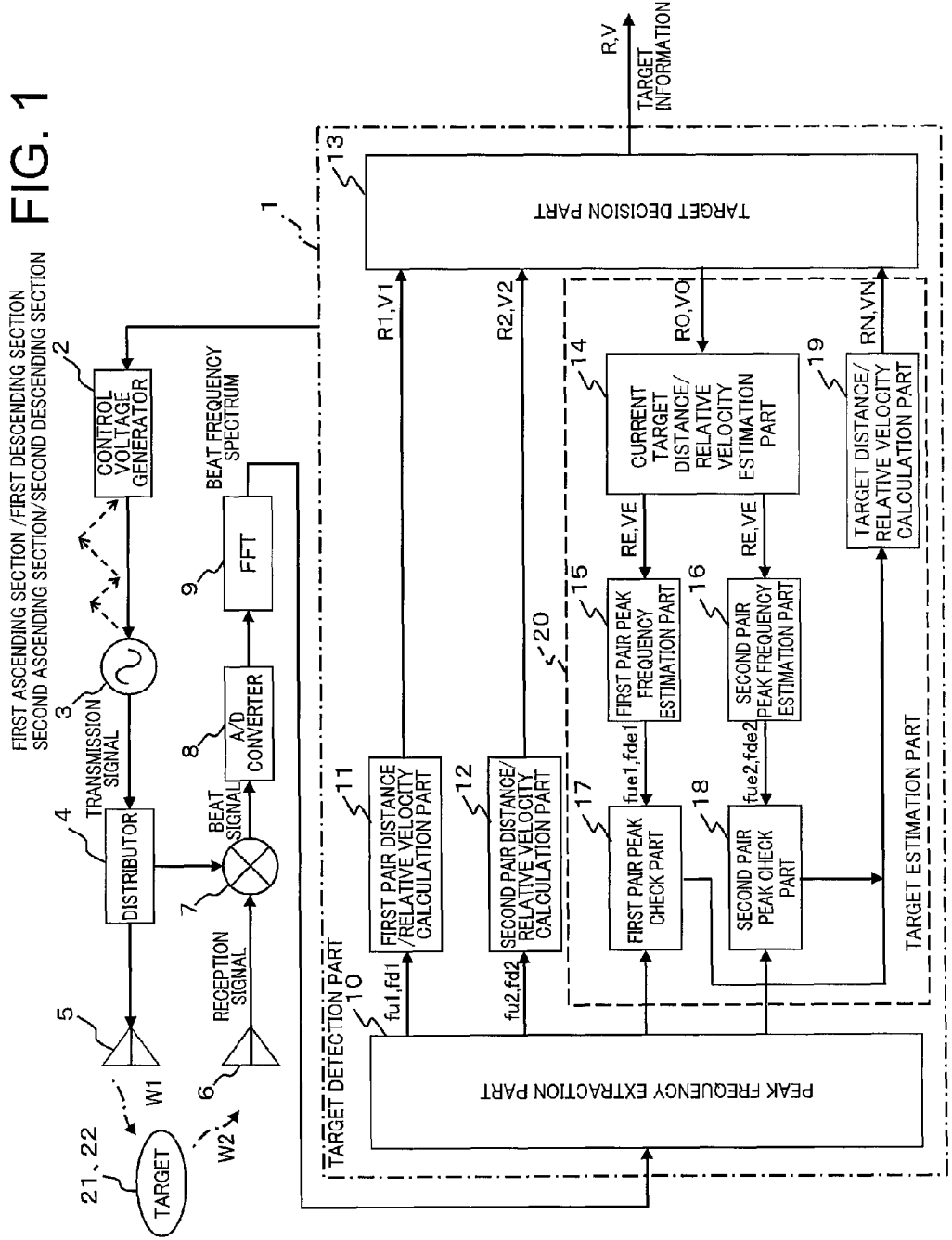
FIG. 1 is a block diagram illustrating a configuration of a radar device according to a first embodiment of the present invention.

Hereinafter, a radar device according to preferred embodiments of the present invention is described with reference to the accompanying drawings. In the respective drawings, the same or equivalent parts are denoted by the same reference numerals for description. In the following embodiments, a case where there are two targets is exemplified, but the present invention is not limited to this configuration, and the number of targets may be three or more.

First Embodiment

FIG. 1 is a block diagram illustrating a configuration of a radar device according to a first embodiment of the present invention. Referring to FIG. 1, the radar device includes a target detection part 1, a control voltage generator 2, a voltage controlled oscillator (hereinafter, referred to as "VCO") 3, a distributor 4, a transmitter antenna 5 (transmitter part), a receiver antenna 6 (receiver part), a mixer 7 (mixing part), an A/D converter 8, and a fast Fourier transformer 9 (hereinafter, referred to as "FFT 9").

The target detection part 1 calculates distances to two targets 21 and 22 and relative velocities to the targets 21 and 22, and outputs the calculated distances and relative velocities to an external device (not shown) as target information. The target detection part 1 includes a microprocessor (not shown) having a central processing unit (CPU) and a memory storing a program.

The control voltage generator 2 generates a control voltage having four modulation sections (details thereof are described later) under the control of the target detection part 1, and outputs the control voltage to the VCO 3. The VCO 3 generates a transmission signal whose frequency is temporally ascendingly modulated and descendingly modulated according to the control voltage from the control voltage generator 2, and outputs the transmission signal to the distributor 4. The distributor 4 distributes and outputs the transmission signal from the VCO 3 to the transmitter antenna and the mixer 7. The transmitter antenna 5 radiates the transmission signal from the distributor 4 to space as a transmission wave W1.

The receiver antenna 6 receives a reflected wave W2 obtained by reflecting the transmission wave W1 by the targets 21 and 22 as a reception signal, and outputs the reception signal to the mixer 7. The mixer 7 mixes the transmission signal from the distributor 4 with the reception signal from the receiver antenna 6, generates and outputs a beat signal to the A/D converter 8. The A/D converter 8 converts the beat signal from the mixer 7 into a digital signal from an analog signal, and outputs the digital signal to the FFT 9. The FFT 9 subjects the digitized beat signal from the A/D converter 8 to frequency analysis, and outputs the frequency analysis result (beat frequency spectrum) to the target detection part 1.

Subsequently, the detailed configuration of the target detection part 1 is described.

The target detection part 1 includes a peak frequency extraction part 10, a first pair distance/relative velocity calculation part 11, a second pair distance/relative velocity calculation part 12, a target decision part 13, a current target distance/relative velocity estimation part 14, a first pair peak frequency estimation part 15, a second pair peak frequency estimation part 16, a first pair peak check part 17, a second pair peak check part 18, and a target distance/relative velocity calculation part 19. In this example, the current target distance/relative velocity estimation part 14, the first pair peak frequency estimation part 15, the second pair peak frequency estimation part 16, the first pair peak check part 17, the second pair peak check part 18, and the target distance/relative velocity calculation part 19 together configure a target estimation part 20.

The peak frequency extraction part 10 extracts a peak frequency based on the frequency analysis result of the beat signal from the FFT 9. The first pair distance/relative velocity calculation part 11 pairs peak frequencies {fu1, fd1} of two modulation sections among the four modulation sections to generate a first pair. The first pair distance/relative velocity calculation part 11 then calculates a distance R1 and a relative velocity V1 of the first pair, and outputs the calculated results to the target decision part 13. The second pair distance/relative velocity calculation part 12 pairs peak frequencies {fu2, fd2} of two modulation sections which are different from the above-mentioned two modulation sections to generate a second pair. The second pair distance/relative velocity calculation part 12 then calculates a distance R2 and a relative velocity V2 of the second pair, and outputs the calculated results to the target decision part 13.

When the distance R1 and the relative velocity V1 of the first pair, which have been calculated by the first pair distance/relative velocity calculation part 11, are substantially equal to the distance R2 and the relative velocity V2 of the second pair, which have been calculated by the second pair distance/relative velocity calculation part 12, respectively, the target decision part 13 decides distances R to the targets 21 and 22 and relative velocities V to the targets 21 and 22, and outputs the decided results to the external device as the target information.

The current target distance/relative velocity estimation part 14 estimates current distances RE and current relative velocities VE based on distances RO to the targets 21 and 22 and relative velocities VO to the targets 21 and 22, which have been decided in a previous cycle in the target decision part 13, by using a linear predictive method, respectively.

The first pair peak frequency estimation part 15 estimates two peak frequencies {fue1, fde1} of the first pair, based on the distances RE and the relative velocities VE which have been estimated by the current target distance/relative velocity estimation part 14. The second pair peak frequency estimation part 16 estimates two peak frequencies {fue2, fde2} of the second pair, based on the distances RE and the relative velocities VE which have been estimated by the current target distance/relative velocity estimation part 14.

The first pair peak check part 17 checks whether or not the two peak frequencies {fue1, fde1} of the first pair, which have been estimated by the first pair peak frequency estimation part 15, are extracted as the peak frequencies by the peak frequency extraction part 10. The second pair peak check part 18 checks whether or not the two peak frequencies {fue2, fde2} of the second pair, which have been estimated by the second pair peak frequency estimation part 16, are extracted as the peak frequencies by the peak frequency extraction part 10.

When the first pair peak check part 17 and the second pair peak check part 18 obtain such a check result that the two peak frequencies of the first pair have been extracted as the peak frequencies, and that one peak frequency of the second pair has been extracted as the peak frequency, and another peak frequency of the second pair has not been extracted as the peak frequency, the target distance/relative velocity calculation part 19 calculates distances RN and relative velocities VN based on the two peak frequencies of the first pair.

In this situation, the target decision part 13 decides the distances RN and the relative velocities VN, which have been calculated by the target distance/relative velocity calculation part 19, as the distances R to the targets 21 and 22 and the relative velocities V to the targets 21 and 22.

When the first pair peak check part 17 and the second pair peak check part 18 obtain such a check result that the two peak frequencies of the second pair have been extracted as the peak frequencies, and that one peak frequency of the first pair has been extracted as the peak frequency, and another peak frequency of the first pair has not been extracted as the peak frequency, the target distance/relative velocity calculation part 19 calculates the distances RN and the relative velocities VN based on the two peak frequencies of the second pair.

Figure 2:
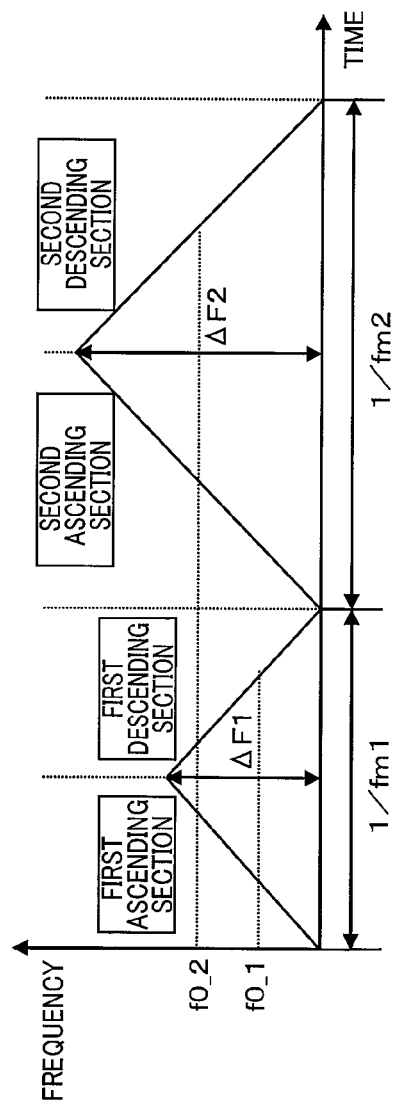
FIG. 2 is an explanatory diagram exemplifying a waveform of a transmission signal (control voltage) having four modulation sections in the radar device according to the first embodiment of the present invention.

Hereinafter, an operation of the radar device according to the first embodiment of the present invention is described with reference to FIGS. 1 and 2. FIG. 2 is an explanatory diagram exemplifying a waveform of a transmission signal (control voltage) having four modulation sections in the radar device according to the first embodiment of the present invention.

First, when a modulation start command is output from the target detection part 1 to the control voltage generator 2, a control voltage having four predetermined modulation sections (for example, a first ascending section and a first descending section, and a second ascending section and a second descending section, each having a triangular shape) is generated from the control voltage generator 2 as illustrated in FIG. 2. The control voltage generated by the control voltage generator 2 is input to the VCO 3, and a transmission signal having four modulation sections, which has been modulated in frequency for each of the modulation sections according to the control voltage, is output from the VCO 3.

In this example, in the first ascending section and the first descending section, and in the second ascending section and the second descending section, the transmission signals different in the repetition frequency fm, the modulation width $\Delta F$, and the center frequency f0 from each other are output from the VCO 3. That is, in the first ascending section and the first descending section, the transmission signal of the repetition frequency fm1, the modulation width $\Delta F1$, and the center frequency f0_1 is output. In the second ascending section and the second descending section, the transmission signal of the repetition frequency fm2, the modulation width $\Delta F2$, and the center frequency f0_2 is output.

The transmission signal from the VCO 3 is distributed and output to the transmitter antenna 5 and the mixer 7 in the distributor 4. The transmission signal output to the transmitter antenna 5 is radiated to space as the transmission wave W1. Subsequently, the reflected waves W2 resulting from reflecting the transmission wave W1 by the targets 21 and 22 are received as the reception signals by the receiver antenna 6, and then output to the mixer 7. The reception signals input to the mixer 7 are mixed with the transmission signal from the distributor 4 to generate the beat signal, and then output to the A/D converter 8.

The beat signal from the mixer 7 is converted into the digital signal from the analog signal for each of the first ascending section, the first descending section, the second ascending section, and the second descending section in the A/D converter 8, and then output to the FFT 9. The digitized beat signal from the A/D converter 8 is subjected to frequency analysis using the fast Fourier transform in the FFT 9. The frequency analysis result (beat frequency spectrum) calculated by the FFT 9 is output to the target detection part 1 for each of the first ascending section, the first descending section, the second ascending section, and the second descending section.

Within the target detection part 1, first, in the peak frequency extraction part 10, the peak frequency is extracted based on the frequency analysis result of the beat signal from the FFT 9. Then, in the first pair distance/relative velocity calculation part 11, the peak frequencies {fu1, fd1} in the first ascending section and the first descending section, which have been extracted by the peak frequency extraction part 10, are paired as the first pair, to calculate the distance R1 and the relative velocity V1 of the first pair. Further, in the second pair distance/relative velocity calculation part 12, the peak frequencies {fu2, fd2} in the second ascending section and the second descending section, which have been extracted by the peak frequency extraction part 10, are paired as the second pair, to calculate the distance R2 and the relative velocity V2 of the second pair.

Then, when the distance R1 and the relative velocity V1 of the first pair, which have been calculated by the first pair distance/relative velocity calculation part 11, are substantially equal to the distance R2 and the relative velocity V2 of the second pair, which have been calculated by the second pair distance/relative velocity calculation part 12, respectively, the target decision part 13 decides the distances R to the targets 21 and 22 and the relative velocities V to the targets 21 and 22, and outputs the decided results to the external device as the target information.

In this situation, the current target distance/relative velocity estimation part 14 estimates the current distances RE and the current relative velocities VE based on the distances RO to the targets 21 and 22 and the relative velocities VO to the targets 21 and 22, which have been decided in a previous cycle in the target decision part 13, by using a linear predictive method, respectively.

Subsequently, in the first pair peak frequency estimation part 15, the two peak frequencies {fue1, fde1} of the first pair are estimated based on the distance RE and the relative velocity VE which have been estimated by the current target distance/relative velocity estimation part 14. Further, in the second pair peak frequency estimation part 16, the two peak frequencies {fue2, fde2} of the second pair are estimated based on the distance RE and the relative velocity VE which have been estimated by the current target distance/relative velocity estimation part 14.

Then, the first pair peak check part 17 checks whether or not the two peak frequencies {fue1, fde1} of the first pair, which have been estimated by the first pair peak frequency estimation part 15, are extracted as the peak frequencies by the peak frequency extraction part 10. Further, the second pair peak check part 18 checks whether or not the two peak frequencies {fue2, fde2} of the second pair, which have been estimated by the second pair peak frequency estimation part 16, are extracted as the peak frequencies by the peak frequency extraction part 10.

Then, when the first pair peak check part 17 and the second pair peak check part 18 obtain such a check result that the two peak frequencies of the first pair have been extracted as the peak frequencies, and that one peak frequency of the second pair has been extracted as the peak frequency, and another peak frequency of the second pair has not been extracted as the peak frequency, the target distance/relative velocity calculation part 19 calculates the distances RN and the relative velocities VN based on the peak frequencies of the first pair.

In this situation, the target decision part 13 decides the distances RN and the relative velocities VN, which have been calculated by the target distance/relative velocity calculation part 19, as the distances R to the targets 21 and 22 and the relative velocities V to the targets 21 and 22.

When the first pair peak check part 17 and the second pair peak check part 18 obtain such a check result that the two peak frequencies of the second pair have been extracted as the peak frequencies, and that one peak frequency of the first pair has been extracted as the peak frequency, and another peak frequency of the first pair has not been extracted as the peak frequency, the target distance/relative velocity calculation part 19 calculates the distances RN and the relative velocities VN based on the peak frequencies of the second pair.

Figure 3:
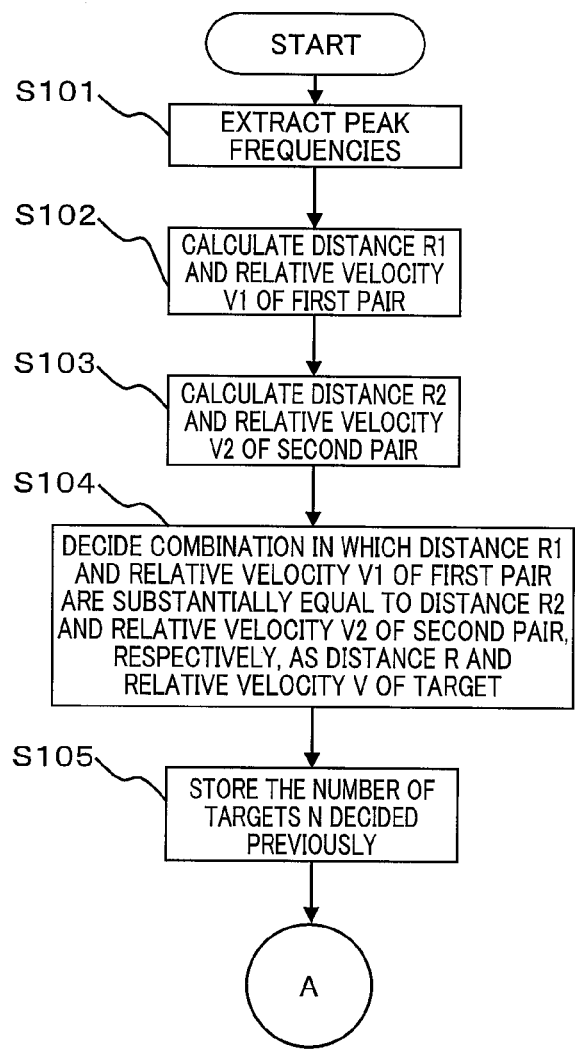
FIG. 3 is a flowchart illustrating a first half of an operation of a target detection part in the radar device according to the first embodiment of the present invention.

Hereinafter, an operation of the target detection part 1 in the radar device according to the first embodiment of the present invention is described in detail below with reference to flowcharts of FIGS. 3 and 4. In this description, suffix a is attached to values related to the target 21, and suffix b is attached to values related to the target 22.

First, the peak frequency extraction part 10 extracts the peak frequencies based on the frequency analysis results (beat frequency spectrum) of the beat signals from the FFT 9 (Step S101). More specifically, the peak frequency extraction part 10 sets a detection threshold value with respect to the amplitude of the beat frequency spectrum, and extracts, as the peak frequency, the beat frequency of the beat frequency spectrum whose amplitude is equal to or larger than the detection threshold value, and is larger than the amplitudes of the adjacent beat frequency spectrums.

Now, referring to FIGS. 5A to 5D, processing for extracting the peak frequency in the peak frequency extraction part 10 is further described. FIG. 5A illustrates the beat frequency spectrum in the first ascending section, FIG. 5B illustrates the beat frequency spectrum in the first descending section, FIG. 5C illustrates the beat frequency spectrum in the second ascending section, and FIG. 5D illustrates the beat frequency spectrum in the second descending section. The axis of abscissa and the axis of ordinate in FIGS. 5A to 5D represent the beat frequency and the amplitude, respectively.

Referring to FIGS. 5A to 5D, the peak frequency extraction part 10 extracts the peak frequencies {fu1_$a$, fu1_$b$} in the first ascending section, extracts {fd1_$a$, fd1_$b$} in the first descending section, extracts {fu2_$b$} in the second ascending section, and extracts {fd2_$a$, fd2_$b$} in the second descending section. FIGS. 5A to 5D exemplify a case where the peak frequency related to the target 21 cannot be extracted in the second ascending section.

Returning to FIG. 3, the first pair distance/relative velocity calculation part 11 pairs the peak frequencies {fu1, fd1} in the first ascending section and the first descending section, which have been extracted in Step S101, to generate the first pair. The first pair distance/relative velocity calculation part 11 then calculates the distance R1 and the relative velocity V1 of the first pair (Step S102). In this situation, the first pair distance/relative velocity calculation part 11 calculates the distance R1 and the relative velocity V1 of the first pair from the peak frequencies {fu1, fd1}, based on the principle of the general FM-CW radar, that is, by using the above-mentioned Expressions (7) and (8).

In an example of FIGS. 5A to 5D, the first pair distance/relative velocity calculation part 11 calculates a distance R1_$aa$ and a relative velocity V1_$aa$ from the two peak frequencies {fu1_$a$, fd1_$a$} of the first pair, and calculates a distance R1_$ab$ and a relative velocity V1_$ab$ from the two peak frequencies {fu1_$a$, fd1_$b$} of the first pair. The first pair distance/relative velocity calculation part 11 also calculates a distance R1_$ba$ and a relative velocity V1_$ba$ from the two peak frequencies {fu1_$b$, fd1_$a$} of the first pair, and calculates a distance R1_$bb$ and a relative velocity V1_$bb$ from the two peak frequencies {fu1_$b$, fd1_$b$} of the first pair.

Then, the second pair distance/relative velocity calculation part 12 pairs the peak frequencies {fu2, fd2} in the second ascending section and the second descending section, which have been extracted in Step S101, to generate the second pair. The second pair distance/relative velocity calculation part 12 then calculates the distance R2 and the relative velocity V2 of the second pair (Step S103). In this situation, the second pair distance/relative velocity calculation part 12 calculates the distance R2 and the relative velocity V2 of the second pair from the peak frequencies {fu2, fd2}, based on the principle of the general FM-CW radar, that is, by using the above-mentioned Expressions (7) and (8).

In the example of FIGS. 5A to 5D, the second pair distance/relative velocity calculation part 12 calculates a distance R2_$ba$ and a relative velocity V2_$ba$ from the two peak frequencies {fu2_$b$, fd2_$a$} of the second pair, and calculates a distance R2_$bb$ and a relative velocity V2_$bb$ from the two peak frequencies {fu2_$b$, fd2_$b$} of the second pair.

Then, the target decision part 13 decides, as the distances R to the targets 21 and 22 and the relative velocities V to the targets 21 and 22, a combination in which the distance R1 and the relative velocity V1 of the first pair, which have been calculated by the first pair distance/relative velocity calculation part 11, are substantially equal to the distance R2 and the relative velocity V2 of the second pair, which have been calculated by the second pair distance/relative velocity calculation part 12, respectively (Step S104).

The target decision part 13 may set the distances R to the targets 21 and 22 to an average of the distance R1 of the first pair and the distance R2 of the second pair, and may set the relative velocities V to the targets 21 and 22 to an average of the relative velocity V1 of the first pair and the relative velocity V2 of the second pair. Alternatively, the target decision part 13 may set the distances R and the relative velocities V to the targets 21 and 22 to the distance and the relative velocity of any one of the first pair and the second pair.

In the example of FIGS. 5A to 5D, the first pair distance/relative velocity calculation part 11 calculates the distance R1_$aa$ and the relative velocity V1_$aa$, the distance R1_$ab$ and the relative velocity V1_$ab$, the distance R1_$ba$ and the relative velocity V1_$ba$, and the distance R1_$bb$ and the relative velocity V1_$bb$ of the first pair. The second pair distance/relative velocity calculation part 12 calculates the distance R2_$ba$ and the relative velocity V2_$ba$, and the distance R2_$bb$ and the relative velocity V2_$bb$ of the second pair.

In this situation, the distance R1_$bb$ and the relative velocity V1_$bb$ of the first pair with respect to the target 22 are substantially equal to the distance R2_$bb$ and the relative velocity V2_$bb$ of the second pair with respect to the target 22, respectively. Therefore, the target decision part 13 decides those distances and relative velocities as a distance R_b to the target 22 and a relative velocity V_b to the target 22.

However, there is no second pair having a distance and a relative velocity substantially equal to the distance R1_aa and the relative velocity V1_aa of the first pair with respect to the target 21. Therefore, the target decision part 13 cannot decide a distance R_a to the target 21 and a relative velocity V_a to the target 21. This is because the peak frequency {fu2_a} with respect to the target 21 cannot be extracted in the second ascending section, and hence a distance R2_aa and a relative velocity V2_aa of the second pair cannot be calculated.

Accordingly, there is no pair having a distance and a relative velocity which are substantially equal to the distance R1_aa and the relative velocity V1_aa of the first pair, the distance R1_ab and the relative velocity V1_ab of the first pair, the distance R1_ba and the relative velocity V1_ba of the first pair, and the distance R2_ba and the relative velocity V2_ba of the second pair. Therefore, those pairs are excluded as mispairing up to now.

Then, the current target distance/relative velocity estimation part 14 counts and stores the number of targets N decided in the previous cycle in the target decision part 13 (Step S105). In the example of FIGS. 5A to 5D, it is assumed that the number of targets N decided previously is "2".

Then, the current target distance/relative velocity estimation part 14 estimates the current distances RE and the current relative velocities VE based on the distances RO to the targets 21 and 22 and the relative velocities VO to the targets 21 and 22, which have been decided previously in the target decision part 13, by using the following Expressions (13) and (14) which are the general linear predictive method, respectively (Step S106). In Expressions (13) and (14), Δt represents a processing time from the previous time to the current time, and the approaching direction of the relative velocity VO is indicated by +.

$$RE = RO - VO \cdot \Delta t \quad (13)$$

$$VE = VO \quad (14)$$

In the example of FIGS. 5A to 5D, the current target distance/relative velocity estimation part 14 estimates a current distance RE_aa and a current relative velocity VE_aa with respect to the target 21, and a current distance RE_bb and a current relative velocity VE_bb with respect to the target 22, based on a distance RO_aa and a relative velocity VO_aa with respect to the target 21, and a distance RO_bb and a relative velocity VO_bb with respect to the target 22, which have been decided previously.

Then, the first pair peak frequency estimation part 15 estimates the two peak frequencies {fue1, fde1} of the first pair, based on the distances RE and the relative velocities VE, which have been estimated by the current target distance/relative velocity estimation part 14 (Step S107). That is, the first pair peak frequency estimation part 15 estimates the peak frequencies {fue1, fde1} in the first ascending section and the first descending section, based on the estimated distances RE and the estimated relative velocities VE by using the above-mentioned Expressions (11) and (12).

In the example of FIGS. 5A to 5D, the first pair peak frequency estimation part 15 estimates the two peak frequencies {fue1_a, fde1_a} of the first pair, based on the distances RE_aa and the relative velocities VE_aa with respect to the target 21, which have been estimated by the current target distance/relative velocity estimation part 14. Further, the first pair peak frequency estimation part 15 estimates the two peak frequencies {fue1_b, fde1_b} of the first pair based on the distance RE_bb and the relative velocity VE_bb with respect to the target 22, which have been estimated by the current target distance/relative velocity estimation part 14.

Then, the second pair peak frequency estimation part 16 estimates the two peak frequencies {fue2, fde2} of the second pair, based on the distances RE and the relative velocities VE, which have been estimated by the current target distance/relative velocity estimation part 14 (Step S108). That is, the second pair peak frequency estimation part 16 estimates the peak frequencies {fue2, fde2} in the second ascending section and the second descending section, based on the estimated distances RE and the estimated relative velocities VE by using the above-mentioned Expressions (11) and (12).

In the example of FIGS. 5A to 5D, the second pair peak frequency estimation part 16 estimates the two peak frequencies {fue2_a, fde2_a} of the second pair, based on the distances RE_aa and the relative velocities VE_aa with respect to the target 21, which have been estimated by the current target distance/relative velocity estimation part 14. Further, the second pair peak frequency estimation part 16 estimates the two peak frequencies {fue2_b, fde2_b} of the second pair based on the distance RE_bb and the relative velocity VE_bb with respect to the target 22, which have been estimated by the current target distance/relative velocity estimation part 14.

Then, the first pair peak check part 17 checks whether or not the two peak frequencies {fue1, fde1} of the first pair, which have been estimated by the first pair peak frequency estimation part 15, are extracted as the peak frequencies by the peak frequency extraction part 10 (Step S109). More specifically, when a difference between the peak frequencies {fue1, fde1} estimated by the first pair peak frequency estimation part 15 and the peak frequencies extracted by the peak frequency extraction part 10 falls within a given range (for example, 0), the first pair peak check part 17 determines that the two peak frequencies of the first pair are extracted as the peak frequencies.

In the example of FIGS. 5A to 5D, both of the two peak frequencies {fue1_a, fde1_a} of the first pair with respect to the target 21, which have been estimated by the first pair peak frequency estimation part 15, are extracted as the peak frequencies {fu1_a, fd1_a} by the peak frequency extraction part 10. Further, both of the two peak frequencies {fue1_b, fde1_b} of the first pair with respect to the target 22, which have been estimated by the first pair peak frequency estimation part 15, are extracted as the peak frequencies {fu1_b, fd1_b} by the peak frequency extraction part 10.

Then, the second pair peak check part 18 checks whether or not the two peak frequencies {fue2, fde2} of the second pair, which have been estimated by the second pair peak frequency estimation part 16, are extracted as the peak frequencies by the peak frequency extraction part 10 (Step S110). More specifically, when a difference between the peak frequencies {fue2, fde2} estimated by the second pair peak frequency estimation part 16 and the peak frequencies extracted by the peak frequency extraction part 10 falls within a given range (for example, 0), the second pair peak check part 18 determines that the two peak frequencies of the second pair are extracted as the peak frequencies.

In the example of FIGS. 5A to 5D, only one of the two peak frequencies {fue2_a, fde2_a} of the second pair with respect to the target 21, which have been estimated by the second pair peak frequency estimation part 16, are extracted as the peak frequency {fd2_a} by the peak frequency extraction part 10. Further, both of the two peak frequencies {fue2_b, fde2_b} of the second pair with respect to the target 22, which have been estimated by the second pair peak frequency estimation part 16, are extracted as the peak frequencies {fu2_b, fd2_b} by the peak frequency extraction part 10.

Then, the target distance/relative velocity calculation part 19 determines whether or not both of the two peak frequencies {fue1, fde1} of the first pair are extracted as the peak frequencies by the peak frequency extraction part 10, and only one of the two peak frequencies {fue2, fde2} of the second pair is extracted as the peak frequency by the peak frequency extraction part 10 (Step S111).

When the determination result is "YES" in Step S111, both of the two peak frequencies {fue1, fde1} of the first pair are extracted as the peak frequencies by the peak frequency extraction part 10, and only one of the two peak frequencies {fue2, fde2} of the second pair is extracted as the peak frequency by the peak frequency extraction part 10. Therefore, the target distance/relative velocity calculation part 19 calculates the distances RN to the targets 21 and 22 and the relative velocities VN to the targets 21 and 22, based on the two peak frequencies {fu1, fd1} of the first pair, which have been extracted by the peak frequency extraction part 10, by using the above-mentioned Expressions (7) and (8) (Step S112).

In the example of FIGS. 5A to 5D, both of the two peak frequencies {fue1_a, fde1_a} of the first pair with respect to the target 21 are extracted as the peak frequencies {fu1_a, fd1_a}, and only one of the two peak frequencies {fue1_a, fde2_a} of the second pair with respect to the target 21 is extracted as the peak frequency {fd2_a}. Therefore, the target distance/relative velocity calculation part 19 calculates the distance RN_a to the target 21 and the relative velocity VN_a to the target 21, based on the extracted peak frequencies {fu1_a, fd1_a} of the first pair.

On the other hand, when the determination result is "NO" in Step S111, the target distance/relative velocity calculation part 19 determines whether or not both of the two peak frequencies {fue2, fde2} of the second pair are extracted as the peak frequencies by the peak frequency extraction part 10, and only one of the two peak frequencies {fue1, fde1} of the first pair is extracted as the peak frequency by the peak frequency extraction part 10 (Step S113).

When the determination result is "YES" in Step S113, both of the two peak frequencies {fue2, fde2} of the second pair are extracted as the peak frequencies by the peak frequency extraction part 10, and only one of the two peak frequencies {fue1, fde1} of the first pair is extracted as the peak frequency by the peak frequency extraction part 10. Therefore, the target distance/relative velocity calculation part 19 calculates the distances RN to the targets 21 and 22 and the relative velocities VN to the targets 21 and 22, based on the two peak frequencies {fu2, fd2} of the second pair, which have been extracted by the peak frequency extraction part 10, by using the above-mentioned Expressions (7) and (8) (Step S114).

Further, in the example of FIGS. 5A to 5D, both of the two peak frequencies {fue1_b, fde1_b} of the first pair with respect to the target 22 are extracted as the peak frequencies {fu1_b, fd1_b}, respectively, and both of the two peak frequencies {fue2_b, fde2_b} of the second pair with respect to the target 22 are extracted as the peak frequencies {fu2_b, fd2_b}, respectively. Therefore, the determination result is "NO" in Step S113, and the processing proceeds to Step S116 (which is described later).

Then, the target decision part 13 decides the distances RN to the targets 21 and 22 and the relative velocities VN to the targets 21 and 22, which have been calculated by the target distance/relative velocity calculation part 19, as the distances R to the targets 21 and 22 and the relative velocities V to the targets 21 and 22 (Step S115). In the example of FIGS. 5A to 5D, the target decision part 13 decides the distance RN_a to the target 21 and the relative velocity VN_a to the target 21, which have been calculated by the target distance/relative velocity calculation part 19, as the distance R_a to the target 21 and the relative velocity V_a to the target 21.

Then, the current target distance/relative velocity estimation part 14 determines whether or not processing for the N targets (two targets in the example of FIGS. 5A to 5D) decided in the previous cycle, which have been counted in Step S105, has been completed (Step S116).

Figure 4:
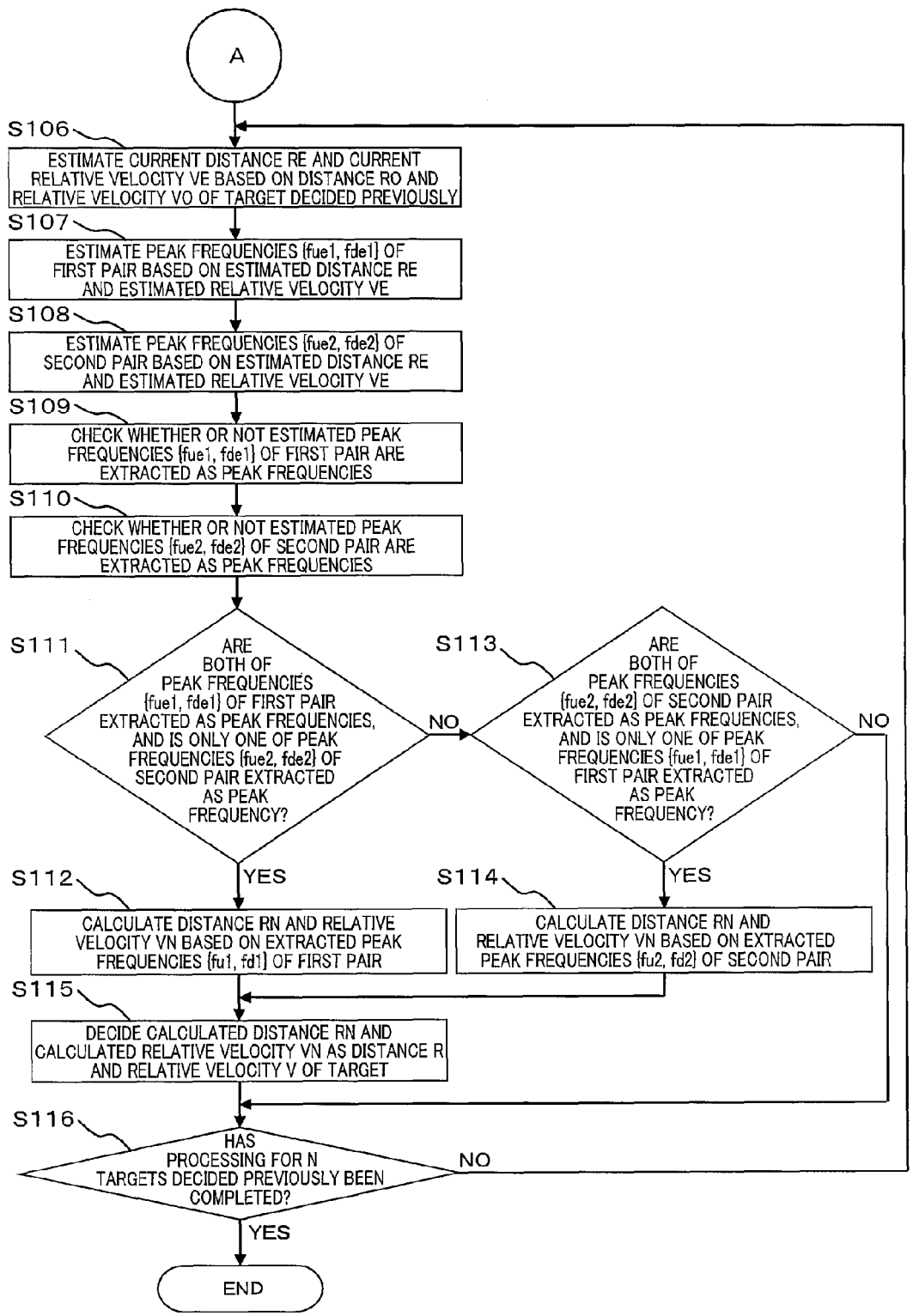
FIG. 4 is a flowchart illustrating a second half of the operation of the target detection part in the radar device according to the first embodiment of the present invention.

When it is determined that the processing has been completed (that is, "YES") in Step S116, the processing of FIG. 4 is completed.

On the other hand, when it is determined that the processing has not yet been completed (that is, "NO") in Step S116, the processing returns to Step S106, and the processing of Steps S106 to S116 is repetitively executed.

As described above, according to the first embodiment, when at least one of the peak frequencies of the beat signals cannot be extracted, and the pair of peak frequencies cannot be generated, the target estimation part estimates the distances to the targets and the relative velocities to the targets based on the distances to the targets and the relative velocities to the targets, which have been decided by the target decision part in the previous cycle.

Further, when the two peak frequencies of the first pair, which are estimated by the first pair peak frequency estimation part, are extracted as the peak frequencies by the peak frequency extraction part, and when one peak frequency of the second pair, which has been estimated by the second pair peak frequency estimation part, is extracted as the peak frequency by the peak frequency extraction part, and another peak frequency of the second pair is not extracted as the peak frequency, the target distance/relative velocity calculation part calculates the distances to the targets and the relative velocities to the targets based on the two peak frequencies of the first pair.

Further, when the two peak frequencies of the second pair, which are estimated by the second pair peak frequency estimation part, are extracted as the peak frequencies by the peak frequency extraction part, and when one peak frequency of the first pair, which has been estimated by the first pair peak frequency estimation part, is extracted as the peak frequency by the peak frequency extraction part, and another peak frequency of the first pair is not extracted as the peak frequency, the target distance/relative velocity calculation part calculates the distances to the targets and the relative velocities to the targets based on the two peak frequencies of the second pair.

For that reason, the mispairing can be prevented from occurring, and the distances to the targets and the relative velocities to the targets can be obtained even when at least one of the peak frequencies of the beat signals cannot be extracted and the pair of the peak frequencies cannot be generated.

Second Embodiment

In the above-mentioned first embodiment, a case where any one of the two peak frequencies of the first pair, which have been estimated by the first pair peak frequency estimation part 15, and the two peak frequencies of the second pair, which have been estimated by the second pair peak frequency estimation part 16, is not extracted as the peak frequency (case of FIGS. 5A to 5D), is described. In a second embodiment, a case where the two peak frequencies of the first pair or the two peak frequencies of the second pair are not extracted as the peak frequencies (case of FIGS. 7A to 7D) is described. A block diagram illustrating a configuration of a radar device according to the second embodiment of the present invention is the same as that of FIG. 1 illustrating the above-mentioned first embodiment, and therefore its description is omitted.

Hereinafter, an operation of the target detection part 1 in the radar device according to the second embodiment of the present invention is described in detail below with reference to flowcharts of FIGS. 3 and 6. In this description, suffix a is attached to values related to the target 21, and suffix b is attached to values related to the target 22. Further, the description of the processing which is the same as that of the above-mentioned first embodiment is omitted.

First, the peak frequency extraction part 10 extracts the peak frequencies based on the frequency analysis results (beat frequency spectrum) of the beat signals from the FFT 9 (Step S101). More specifically, the peak frequency extraction part 10 sets a detection threshold value with respect to the amplitude of the beat frequency spectrum, and extracts, as the peak frequency, the beat frequency of the beat frequency spectrum whose amplitude is equal to or larger than the detection threshold value, and is larger than the amplitudes of the adjacent beat frequency spectrums.

Now, referring to FIGS. 7A to 7D, processing for extracting the peak frequency in the peak frequency extraction part 10 is further described. FIG. 7A illustrates the beat frequency spectrum in the first ascending section, FIG. 7B illustrates the beat frequency spectrum in the first descending section, FIG. 7C illustrates the beat frequency spectrum in the second ascending section, and FIG. 7D illustrates the beat frequency spectrum in the second descending section. The axis of abscissa and the axis of ordinate in FIGS. 7A to 7D represent the beat frequency and the amplitude, respectively.

Referring to FIGS. 7A to 7D, the peak frequency extraction part 10 extracts the peak frequencies {fu1_a, fu1_b} in the first ascending section, extracts {fd1_a, fd1_b} in the first descending section, extracts {fu2_b} in the second ascending section, and extracts {fd2_b} in the second descending section. FIGS. 7A to 7D exemplify a case where the peak frequency related to the target 21 cannot be extracted in the second ascending section and the peak frequency related to the target 21 cannot be extracted in the second descending section.

Figure 6:
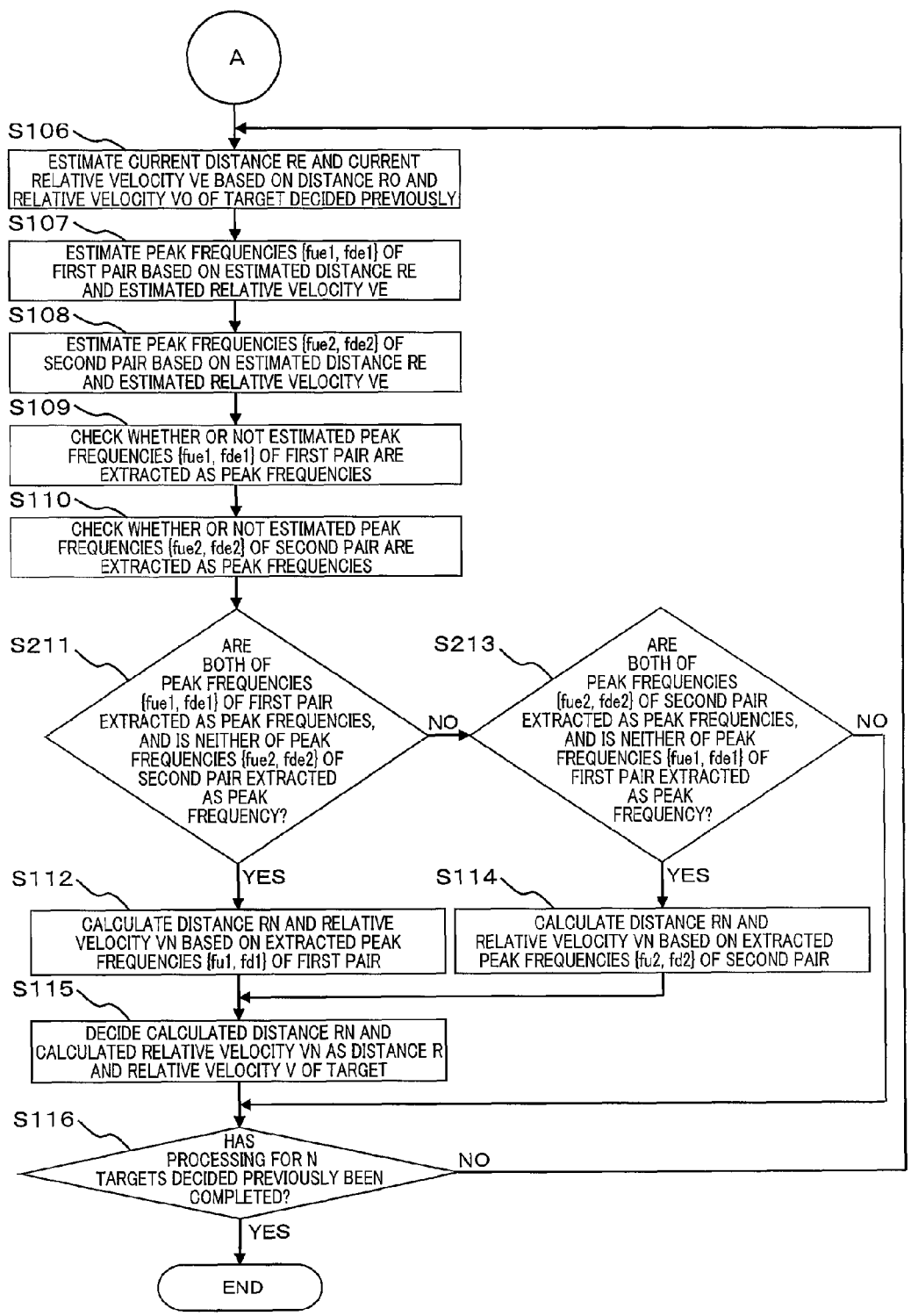
FIG. 6 is a flowchart illustrating a second half of an operation of a target detection part in a radar device according to a second embodiment of the present invention.

Returning to FIG. 3, the processing of Step S102 to Step S108 of FIG. 6 is the same as that of the above-mentioned first embodiment, and therefore its description is omitted.

Then, the first pair peak check part 17 checks whether or not the two peak frequencies {fue1, fde1} of the first pair, which have been estimated by the first pair peak frequency estimation part 15, are extracted as the peak frequencies by the peak frequency extraction part 10 (Step S109). More specifically, when a difference between the peak frequencies {fue1, fde1} estimated by the first pair peak frequency estimation part 15 and the peak frequencies extracted by the peak frequency extraction part 10 falls within a given range (for example, 0), the first pair peak check part 17 determines that the two peak frequencies of the first pair are extracted as the peak frequencies.

In the example of FIGS. 7A to 7D, both of the two peak frequencies {fue1_a, fde1_a} of the first pair with respect to the target 21, which have been estimated by the first pair peak frequency estimation part 15, are extracted as the peak frequencies {fu1_a, fd1_a} by the peak frequency extraction part 10. Further, both of the two peak frequencies {fue1_b, fde1_b} of the first pair with respect to the target 22, which have been estimated by the first pair peak frequency estimation part 15, are extracted as the peak frequencies {fu1_b, fd1_b} by the peak frequency extraction part 10.

Then, the second pair peak check part 18 checks whether or not the two peak frequencies {fue2, fde2} of the second pair, which have been estimated by the second pair peak frequency estimation part 16, are extracted as the peak frequencies by the peak frequency extraction part 10 (Step S110). More specifically, when a difference between the peak frequencies {fue2, fde2} estimated by the second pair peak frequency estimation part 16 and the peak frequencies extracted by the peak frequency extraction part 10 falls within a given range (for example, 0), the second pair peak check part 18 determines that the two peak frequencies of the second pair are extracted as the peak frequencies.

In the example of FIGS. 7A to 7D, neither of the two peak frequencies {fue2_a, fde2_a} of the second pair with respect to the target 21, which have been estimated by the second pair peak frequency estimation part 16, are extracted as the peak frequency. Further, both of the two peak frequencies {fue2_b, fde2_b} of the second pair with respect to the target 22, which have been estimated by the second pair peak frequency estimation part 16, are extracted as the peak frequencies {fu2_b, fd2_b} by the peak frequency extraction part 10.

Then, the target distance/relative velocity calculation part 19 determines whether or not both of the two peak frequencies {fue1, fde1} of the first pair are extracted as the peak frequencies by the peak frequency extraction part 10, and neither of the two peak frequencies {fue2, fde2} of the second pair are extracted as the peak frequencies (Step S211).

When the determination result is "YES" in Step S211, both of the two peak frequencies {fue1, fde1} of the first pair are extracted as the peak frequencies by the peak frequency extraction part 10, and neither of the two peak frequencies {fue2, fde2} of the second pair are extracted as the peak frequencies. Therefore, the target distance/relative velocity calculation part 19 calculates the distances RN to the targets 21 and 22 and the relative velocities VN to the targets 21 and 22, based on the two peak frequencies {fu1, fd1} of the first pair, which have been extracted by the peak frequency extraction part 10, by using the above-mentioned Expressions (7) and (8) (Step S112).

In the example of FIGS. 7A to 7D, both of the two peak frequencies {fue1_a, fde1_a} of the first pair with respect to the target 21 are extracted as the peak frequencies {fu1_a, fd1_a}, and neither of the two peak frequencies {fue1_a, fde2_a} of the second pair with respect to the target 21 are extracted as the peak frequency. Therefore, the target distance/relative velocity calculation part 19 calculates the distance RN_a to the target 21 and the relative velocity VN_a to the target 21, based on the extracted peak frequencies {fu1_a, fd1_a} of the first pair.

On the other hand, when the determination result is "NO" in Step S211, the target distance/relative velocity calculation part 19 determines whether or not both of the two peak frequencies {fue2, fde2} of the second pair are extracted as the peak frequencies by the peak frequency extraction part 10, and neither of the two peak frequencies {fue1, fde1} of the first pair are extracted as the peak frequencies (Step S213).

When the determination result is "YES" in Step S213, both of the two peak frequencies {fue2, fde2} of the second pair are extracted as the peak frequencies by the peak frequency extraction part 10, and neither of the two peak frequencies {fue1, fde1} of the first pair are extracted as the peak frequencies. Therefore, the target distance/relative velocity calculation part 19 calculates the distances RN to the targets 21 and 22 and the relative velocities VN to the targets 21 and 22, based on the two peak frequencies {fu2, fd2} of the second pair, which have been extracted by the peak frequency extraction part 10, by using the above-mentioned Expressions (7) and (8) (Step S114).

Further, in the example of FIGS. 7A to 7D, both of the two peak frequencies {fue1_b, fde1_b} of the first pair with respect to the target 22 are extracted as the peak frequencies {fu1_b, fd1_b}, respectively, and both of the two peak frequencies {fue2_b, fde2_b} of the second pair with respect to the target 22 are extracted as the peak frequencies {fu2_b, fd2_b}, respectively. Therefore, the determination result is "NO" in Step S213, and the processing proceeds to Step S116.

Then, the target decision part 13 decides the distances RN to the targets 21 and 22 and the relative velocities VN to the targets 21 and 22, which have been calculated by the target distance/relative velocity calculation part 19, as the distances R to the targets 21 and 22 and the relative velocities V to the targets 21 and 22 (Step S115). In the example of FIGS. 7A to 7D, the target decision part 13 decides the distance RN_a to the target 21 and the relative velocity VN_a to the target 21, which have been calculated by the target distance/relative velocity calculation part 19, as the distance R_a to the target 21 and the relative velocity V_a to the target 21.

Then, the current target distance/relative velocity estimation part 14 determines whether or not processing for the N targets (two targets in the example of FIGS. 7A to 7D) decided in the previous cycle, which have been counted in Step S105, has been completed (Step S116).

When it is determined that the processing has been completed (that is, "YES") in Step S116, the processing of FIG. 6 is completed.

On the other hand, when it is determined that the processing has not yet been completed (that is, "NO") in Step S116, the processing returns to Step S106, and the processing of Steps S106 to S116 is repetitively executed.

As described above, according to the second embodiment, when at least one of the peak frequencies of the beat signals cannot be extracted, and the pair of peak frequencies cannot be generated, the target estimation part estimates the distances to the targets and the relative velocities to the targets based on the distances to the targets and the relative velocities to the targets, which have been decided by the target decision part in the previous cycle.

Further, the two peak frequencies of the first pair, which have been estimated by the first pair peak frequency estimation part, are extracted as the peak frequencies by the peak frequency extraction part, neither of the two peak frequencies of the second pair, which have been estimated by the second pair peak frequency estimation part, are extracted as the peak frequencies, and the other peak frequency of the second pair has not been extracted as the peak frequency. In this case, the target distance/relative velocity calculation part calculates the distances to the targets and the relative velocities to the targets based on the two peak frequencies of the first pair.

Further, the two peak frequencies of the second pair, which have been estimated by the second pair peak frequency estimation part, are extracted as the peak frequencies by the peak frequency extraction part, neither of the two peak frequencies of the first pair, which have been estimated by the first pair peak frequency estimation part, are extracted as the peak frequencies. In this case, the target distance/relative velocity calculation part calculates the distances to the targets and the relative velocities to the targets based on the two peak frequencies of the second pair.

For that reason, the mispairing can be prevented from occurring, and the distances to the targets and the relative velocities to the targets can be obtained even when at least one of the peak frequencies of the beat signals cannot be extracted and the pair of the peak frequencies cannot be generated.

Third Embodiment

In the above-mentioned first embodiment, a case where anyone of the two peak frequencies of the first pair, which have been estimated by the first pair peak frequency estimation part 15, and the two peak frequencies of the second pair, which have been estimated by the second pair peak frequency estimation part 16, is not extracted as the peak frequency (case of FIGS. 5A to 5D), is described. In the above-mentioned second embodiment, a case where the two peak frequencies of the first pair or the two peak frequencies of the second pair are not extracted as the peak frequencies (case of FIGS. 7A to 7D) is described.

In a third embodiment, a case where one of the two peak frequencies of the first pair is not extracted as the peak frequency, and one of the two peak frequencies of the second pair is not extracted as the peak frequency (case of FIGS. 9A to 9D) is described. A block diagram illustrating a configuration of a radar device according to the third embodiment of the present invention is the same as that of FIG. 1 illustrating the above-mentioned first embodiment, and therefore its description is omitted.

Hereinafter, an operation of the target detection part 1 in the radar device according to the third embodiment of the present invention is described in detail below with reference to flowcharts of FIGS. 3 and 8. In this description, suffix a is attached to values related to the target 21, and suffix b is attached to values related to the target 22. Further, the description of the processing which is the same as that of the above-mentioned first embodiment is omitted.

First, the peak frequency extraction part 10 extracts the peak frequencies based on the frequency analysis results (beat frequency spectrum) of the beat signals from the FFT 9 (Step S101). More specifically, the peak frequency extraction part 10 sets a detection threshold value with respect to the amplitude of the beat frequency spectrum, and extracts, as the peak frequency, the beat frequency of the beat frequency spectrum whose amplitude is equal to or larger than the detection threshold value, and is larger than the amplitudes of the adjacent beat frequency spectrums.

Now, referring to FIGS. 9A to 9D, processing for extracting the peak frequency in the peak frequency extraction part 10 is further described. FIG. 9A illustrates the beat frequency spectrum in the first ascending section, FIG. 9B illustrates the beat frequency spectrum in the first descending section, FIG. 9C illustrates the beat frequency spectrum in the second ascending section, and FIG. 9D illustrates the beat frequency spectrum in the second descending section. The axis of abscissa and the axis of ordinate in FIGS. 9A to 9D represent the beat frequency and the amplitude, respectively.

Referring to FIGS. 9A to 9D, the peak frequency extraction part 10 extracts the peak frequencies {fu1_a, fu1_b} in the first ascending section, extracts {fd1_b} in the first descending section, extracts {fu2_b} in the second ascending section, and extracts {fd2_a, fd2_b} in the second descending section. FIGS. 9A to 9D exemplify a case where the peak frequency related to the target 21 cannot be extracted in the first descending section and the peak frequency related to the target 21 cannot be extracted in the second ascending section.

Figure 8:
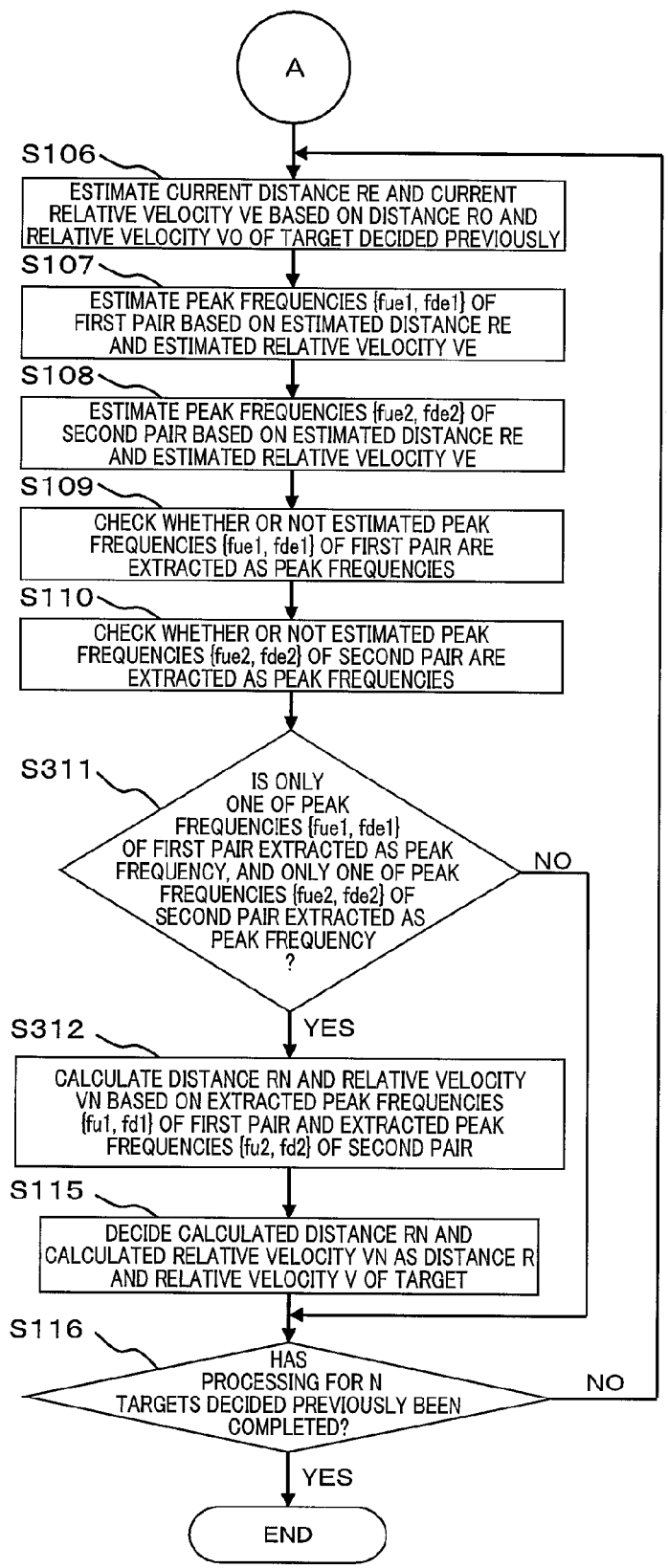
FIG. 8 is a flowchart illustrating a second half of an operation of a target detection part in a radar device according to a third embodiment of the present invention.

Returning to FIG. 3, the processing of from Step S102 to Step S108 in FIG. 8 is the same as that of the above-mentioned first embodiment, and therefore its description is omitted.

Then, the first pair peak check part 17 checks whether or not the two peak frequencies {fue1, fde1} of the first pair, which have been estimated by the first pair peak frequency estimation part 15, are extracted as the peak frequencies by the peak frequency extraction part 10 (Step S109). More specifically, when a difference between the peak frequencies {fue1, fde1} estimated by the first pair peak frequency estimation part 15 and the peak frequencies extracted by the peak frequency extraction part 10 falls within a given range (for example, 0), the first pair peak check part 17 determines that the two peak frequencies of the first pair are extracted as the peak frequencies.

In the example of FIGS. 9A to 9D, only one of the two peak frequencies {fue1_*a*, fde1_*a*} of the first pair with respect to the target 21, which have been estimated by the first pair peak frequency estimation part 15, is extracted as the peak frequency {fu1_*a*} by the peak frequency extraction part 10. Further, both of the two peak frequencies {fue1_*b*, fde1_*b*} of the first pair with respect to the target 22, which have been estimated by the first pair peak frequency estimation part 15, are extracted as the peak frequencies {fu1_*b*, fd1_*b*} by the peak frequency extraction part 10.

Then, the second pair peak check part 18 checks whether or not the two peak frequencies {fue2, fde2} of the second pair, which have been estimated by the second pair peak frequency estimation part 16, are extracted as the peak frequencies by the peak frequency extraction part 10 (Step S110). More specifically, when a difference between the peak frequencies {fue2, fde2} estimated by the second pair peak frequency estimation part 16 and the peak frequencies extracted by the peak frequency extraction part 10 falls within a given range (for example, 0), the second pair peak check part 18 determines that the two peak frequencies of the second pair are extracted as the peak frequencies.

In the example of FIGS. 9A to 9D, only one of the two peak frequencies {fue2_*a*, fde2_*a*} of the second pair with respect to the target 21, which have been estimated by the second pair peak frequency estimation part 16, is extracted as the peak frequency {fd2_*a*} by the peak frequency extraction part 10. Further, both of the two peak frequencies {fue2_*b*, fde2_*b*} of the second pair with respect to the target 22, which have been estimated by the second pair peak frequency estimation part 16, are extracted as the peak frequencies {fu2_*b*, fd2_*b*} by the peak frequency extraction part 10.

Then, the target distance/relative velocity calculation part 19 determines whether or not only one of the two peak frequencies {fue1, fde1} of the first pair is extracted as the peak frequencies by the peak frequency extraction part 10, and only one of the two peak frequencies {fue2, fde2} of the second pair is extracted as the peak frequency by the peak frequency extraction part 10 (Step S311).

When the determination result is "YES" in Step S311, only one of the two peak frequencies {fue1, fde1} of the first pair is extracted as the peak frequency by the peak frequency extraction part 10, and only one of the two peak frequencies {fue2, fde2} of the second pair is extracted as the peak frequency by the peak frequency extraction part 10. Therefore, the target distance/relative velocity calculation part 19 calculates the distances RN to the targets 21 and 22 and the relative velocities VN to the targets 21 and 22, based on the two peak frequencies {fu1, fd1} of the first pair and the two peak frequencies {fu2, fd2} of the second pair, which have been extracted by the peak frequency extraction part 10, by using the above-mentioned Expressions (9) to (12) (Step S312).

In this situation, the target distance/relative velocity calculation part 19 uses the repetition frequency fm1, the modulation width ΔF1, and the center frequency f0_1 in the first ascending section and the first descending section. The target distance/relative velocity calculation part 19 also uses the repetition frequency fm2, the modulation width ΔF2, and the center frequency f0_2 in the second ascending section and the second descending section.

In the example of FIGS. 9A to 9D, only one of the two peak frequencies {fue1_*a*, fde1_*a*} of the first pair with respect to the target 21 is extracted as the peak frequency {fu1_*a*}, and only one of the two peak frequencies {fue2_*a*, fde2_*a*} of the second pair with respect to the target 21 is extracted as the peak frequency {fd2_*a*}. Therefore, the target distance/relative velocity calculation part 19 calculates the distance RN_a to the target 21 and the relative velocity VN_a to the target 21, based on the extracted peak frequency {fu1_*a*} of the first pair and the extracted peak frequency {fd2_*a*} of the second pair.

More specifically, the target distance/relative velocity calculation part 19 derives the following Expressions (15) to (20) from the above-mentioned Expressions (9) to (12), and solves the simultaneous equations of Expressions (17) and (20), to thereby calculate the distance RN_a to the target 21 and the relative velocity VN_a to the target 21.

$$M11 = C/(4 \cdot fm1 \cdot \Delta F1) \quad (15)$$

$$M21 = C/(2 \cdot f0\_1) \quad (16)$$

$$fu1\_a = RN\_a/M11 - VN\_a/M21 \quad (17)$$

$$M12 = C/(4 \cdot fm2 \cdot \Delta F2) \quad (18)$$

$$M22 = C/(2 \cdot f0\_2) \quad (19)$$

$$fd2\_a = RN\_a/M12 + VN\_a/M22 \quad (20)$$

Further, in the example of FIGS. 9A to 9D, both of the two peak frequencies {fue1_*b*, fde1_*b*} of the first pair with respect to the target 22 are extracted as the peak frequencies {fu1_*b*, fd1_*b*}, respectively, and both of the two peak frequencies {fue2_*b*, fde2_*b*} of the second pair with respect to the target 22 are extracted as the peak frequencies {fu2_*b*, fd2_*b*}, respectively. Therefore, the determination result is "NO" in Step S311, and the processing proceeds to Step S116.

Then, the target decision part 13 decides the distances RN to the targets 21 and 22 and the relative velocities VN to the targets 21 and 22, which have been calculated by the target distance/relative velocity calculation part 19, as the distances R to the targets 21 and 22 and the relative velocities V to the targets 21 and 22 (Step S115). In the example of FIGS. 9A to 9D, the target decision part 13 decides the distance RN_a to the target 21 and the relative velocity VN_a to the target 21, which have been calculated by the target distance/relative velocity calculation part 19, as the distance R_a to the target 21 and the relative velocity V_a to the target 21.

Then, the current target distance/relative velocity estimation part 14 determines whether or not processing for the N targets (two targets in the example of FIGS. 9A to 9D) decided in the previous cycle, which have been counted in Step S105, has been completed (Step S116).

When it is determined that the processing has been completed (that is, "YES") in Step S116, the processing of FIG. 8 is completed.

On the other hand, when it is determined that the processing has not yet been completed (that is, "NO") in Step S116, the processing returns to Step S106, and the processing of Steps S106 to S116 is repetitively executed.

As described above, according to the third embodiment, when at least one of the peak frequencies of the beat signals cannot be extracted, and the pair of peak frequencies cannot be generated, the target estimation part estimates the distances to the targets and the relative velocities to the targets based on the distances to the targets and the relative velocities to the targets, which have been decided by the target decision part in the previous cycle.

Further, when one peak frequency of the first pair, which has been estimated by the first pair peak frequency estimation part, is extracted as the peak frequency by the peak frequency extraction part, and another peak frequency of the first pair is not extracted as the peak frequency, and when one peak frequency of the second pair, which has been estimated by the second pair peak frequency estimation part, is extracted as the peak frequency by the peak frequency extraction part, and another peak frequency of the second pair is not extracted as the peak frequency, the target distance/relative velocity calculation part calculates the distances to the targets and the relative velocities to the targets based on the extracted peak frequency of the first pair and the extracted peak frequency of the second pair.

For that reason, the mispairing can be prevented from occurring, and the distances to the targets and the relative velocities to the targets can be obtained even when at least one of the peak frequencies of the beat signals cannot be extracted and the pair of the peak frequencies cannot be generated.

The above-mentioned first to third embodiments describe, as a system of calculating the distances R to the targets 21 and 22 and the relative velocities V to the targets 21 and 22, a system using the principle of the general FM-CW radar. However, the present invention is not limited to this configuration, and may use an FM-pulse Doppler radar system in which the transmission signal is sectioned in a pulse shape and modulated, or other radar systems.

Further, the above-mentioned first to third embodiments describe, as the four modulation sections, a case of using the first ascending section, the first descending section, the second ascending section, and the second descending section of the triangular shape (the repetition frequency fm1, the modulation width ΔF1, and the center frequency f0_1 in the first ascending section and the first descending section, and the repetition frequency fm2, the modulation width ΔF2, and the center frequency f0_2 in the second ascending section and the second descending section). However, the present invention is not limited to this configuration. The modulation sections may be different in ascending or descending, the repetition frequency fm, the modulation width ΔF, or the center frequency f0 for each section, or four or more modulation sections may be provided.

What is claimed is:

1. A radar device, comprising:
    a transmission part that radiates a transmission signal having four modulation sections as a transmission wave;
    a reception part that receives a reflected wave resulting from reflecting the transmission wave by a target as a reception signal;
    a mixing part that mixes the transmission signal and the reception signal together to generate a beat signal; and
    a target detection part that calculates a distance to the target and a relative velocity to the target based on the beat signal,
    wherein the target detection part comprises:
        a peak frequency extraction part configured to extract peak frequencies in the respective four modulation sections from the beat signal that has been analyzed in frequency;
        a first pair distance/relative velocity calculation part configured to pair the peak frequencies in two modulation sections of the four modulation sections among the peak frequencies extracted by the peak frequency extraction part to generate a first pair, and calculate the distance and the relative velocity of the first pair;
        a second pair distance/relative velocity calculation part configured to pair the peak frequencies in another two modulation sections different from the two modulation sections among the peak frequencies extracted by the peak frequency extraction part to generate a second pair, and calculate the distance and the relative velocity of the second pair;
        a target decision part configured to decide the distance to the target and the relative velocity to the target when the distance and the relative velocity of the first pair are equal to the distance and the relative velocity of the second pair, respectively; and
        a target estimation part configured to estimate a distance to the target and a relative velocity to the target based on a distance to the target and a relative velocity to the target, which have been decided by the target decision part in a previous cycle, when at least one of the peak frequencies of the beat signal cannot be extracted and the pair of the peak frequencies cannot be generated.

2. A radar device according to claim 1, wherein the target estimation part comprises:
    a current target distance/relative velocity estimation part configured to estimate a current distance and a current relative velocity by using a linear predictive method based on the distance to the target and the relative velocity to the target, which have been decided by the target decision part in the previous cycle, respectively;
    a first pair peak frequency estimation part configured to estimate two peak frequencies of the first pair based on the current distance and the current relative velocity, which have been estimated by the current target distance/relative velocity estimation part;
    a second pair peak frequency estimation part configured to estimate two peak frequencies of the second pair based on the current distance and the current relative velocity, which have been estimated by the current target distance/relative velocity estimation part;
    a first pair peak check part configured to check whether or not the two peak frequencies of the first pair, which have been estimated by the first pair peak frequency estimation part, are extracted as the peak frequencies by the peak frequency extraction part;
    a second pair peak check part configured to check whether or not the two peak frequencies of the second pair, which have been estimated by the second pair peak frequency estimation part, are extracted as the peak frequencies by the peak frequency extraction part; and
    a target distance/relative velocity calculation part configured to calculate the distance to the target and the relative velocity to the target when check results of the first pair peak check part and the second pair peak check part show that the at least one of the peak frequencies of the beat signal cannot be extracted and the pair of the peak frequencies cannot be generated.

3. A radar device according to claim 2, wherein the target distance/relative velocity calculation part calculates the distance to the target and the relative velocity to the target based on the two peak frequencies of the first pair, when the two peak frequencies of the first pair, which have been estimated by the first pair peak frequency estimation part, are extracted as the peak frequencies by the peak frequency extraction part, and when one of the peak frequencies of the second pair, which have been estimated by the second pair peak frequency estimation part, is extracted as the peak frequency by the peak frequency extraction part, and another of the peak frequencies of the second pair is not extracted as the peak frequency.

4. A radar device according to claim 2, wherein the target distance/relative velocity calculation part calculates the distance to the target and the relative velocity to the target based on the two peak frequencies of the second pair, when the two peak frequencies of the second pair, which have been estimated by the second pair peak frequency estimation part, are extracted as the peak frequencies by the peak frequency extraction part, and when one of the peak frequencies of the first pair, which have been estimated by the first pair peak frequency estimation part, is extracted as the peak frequency by the peak frequency extraction part, and another of the peak frequencies of the first pair is not extracted as the peak frequency.

5. A radar device according to claim 2, wherein the target distance/relative velocity calculation part calculates the distance to the target and the relative velocity to the target based on the two peak frequencies of the first pair, when the two peak frequencies of the first pair, which have been estimated by the first pair peak frequency estimation part, are extracted as the peak frequencies by the peak frequency extraction part, and when neither of the two peak frequencies of the second pair, which have been estimated by the second pair peak frequency estimation part, is extracted as the peak frequency.

6. A radar device according to claim 2, wherein the target distance/relative velocity calculation part calculates the distance to the target and the relative velocity to the target based on the two peak frequencies of the second pair, when the two peak frequencies of the second pair, which have been estimated by the second pair peak frequency estimation part, are extracted as the peak frequencies by the peak frequency extraction part, and when neither of the two peak frequencies of the first pair, which have been estimated by the first pair peak frequency estimation part, is extracted as the peak frequency.

7. A radar device according to claim 2, wherein, when one of the peak frequencies of the first pair, which have been estimated by the first pair peak frequency estimation part, is extracted as the peak frequency by the peak frequency extraction part, and another of the peak frequencies of the first pair is not extracted as the peak frequency, and when one of the peak frequencies of the second pair, which have been estimated by the second pair peak frequency estimation part, is extracted as the peak frequency by the peak frequency extraction part, and another of the peak frequencies of the second pair is not extracted as the peak frequency, the target distance/relative velocity calculation part calculates the distance to the target and the relative velocity to the target based on the extracted one of the peak frequencies of the first pair and the extracted one of the peak frequencies of the second pair.

8. A radar device according to claim 2, wherein, when a difference between the peak frequency estimated by one of the first pair peak frequency estimation part and the second pair peak frequency estimation part, and the peak frequency extracted by the peak frequency extraction part falls within a given range, the first pair peak check part and the second pair peak check part determine that the extracted peak frequency is extracted as a peak frequency.

9. A radar device according to claim 8, wherein the given range is approximately 0.

\* \* \* \* \*